O. H. Flook,
Elevator.
No. 104,567.　　　　　Patented June 21, 1870.
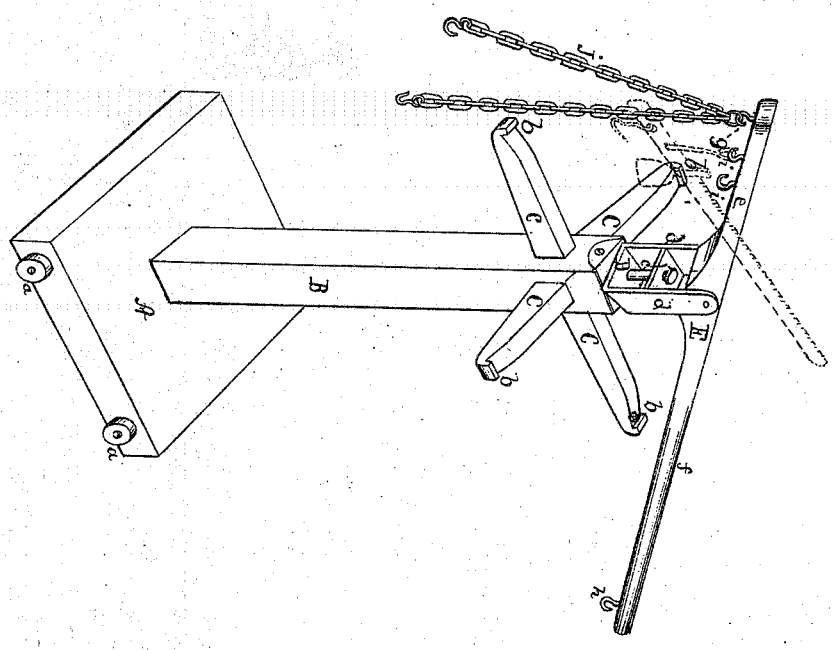
Witnesses:
Adam Geib
Wm. J. Peyton
Inventor:
Oliver H. Flook
by John A. Wiedersheim
Atty.

United States Patent Office.

OLIVER H. FLOOK, OF MIDDLETOWN, MARYLAND.

Letters Patent No. 104,567, dated June 21, 1870.

IMPROVED HOISTING-APPARATUS.

The Schedule referred to in these Letters Patent and making part of the same.

*To all whom it may concern:*

Be it known that I, OLIVER H. FLOOK, of Middletown, in the county of Frederick and State of Maryland, have invented a new and improved Device for Hoisting; and I do hereby declare the following to be a full and correct description of the same, sufficient to enable others skilled in the class to which my invention appertains to fully understand and use the same, reference being had to the accompanying drawing which makes part of this specification, and in which the figure is an elevation of my improved hoisting device.

My invention consists in a device for hoisting and suspending articles, which, for preservation, or any other reason, are to be kept in an elevated suspended position. It is especially applicable for hoisting and suspending animals in slaughter-houses, but may be applied to many other purposes.

In the drawing—

A represents a platform made movable by being placed on wheels or rollers, *a*, and from which rises the standard B of a suitable height, for the purpose desired.

Secured to this standard, near its upper end, are arms, C, provided at their outer ends with notches, *b*.

Rising from the top of the standard B, and moving laterally around a pin or bolt, *c*, is a swivel, D, the arms, *d*, of which, extending upwardly, form a bearing for the lever E pivoted between them.

This lever has a shorter arm, *e*, and a longer one, *f*, each of which is at its end provided with hooks, *g h*, respectively, while on the shorter arm there are other hooks, *i*, for a use to be hereinafter explained.

I will describe the use and operation of my device in a slaughter-house.

An animal having been killed, and it becoming necessary to suspend it for the purpose of cleaning it, the device may be rolled to the animal and one end of the chain *j* secured at each end of the gambrel, by which the animal is to be suspended.

A rope being attached to the hook *h* of the arm *f* of lever E, this arm is pulled down, thereby elevating the shorter arm *e*, to which the animal is attached, until the gambrel or the string or chain attached to and forming part of the latter, can be slipped over the arm C, to which it is to be hung. The ends of chain *j* are then slipped off from the ends of the gambrel, and another animal may be elevated and hung on another arm, C, until all arms are full. Should it be desired to hold anything temporarily suspended without placing it on an arm, C, the rope passing through hook *h* may be secured to the standard B, keeping the arm *f* down and the arm *e* in an elevated position.

The manner of weighing an article suspended on the arm C, without letting it down to the ground, is as follows:

An iron scale-beam is secured to either hook *i*, as may be most suitable. In drawing I show the manner of weighing a butchered animal. The ends of chain *j* being slipped over the ends of the gambrel, the latter is raised and its string or chain slipped from the arm C on to the hook of the scale-beam; the arm *f* being secured by the rope passing through hook *h* to the standard, the weighing can be done, and by releasing the arm *f* the article weighed can be easily replaced on its arm C.

The utility of my improved hoisting device will be apparent without any further explanations.

Having thus described my invention,

What I claim as new, and desire to secure by Letters Patent, is—

1. The herein described apparatus for hoisting and suspending, substantially as shown for the purposes set forth.

2. The combination of the armed standard B with the swivel D and lever E pivoted at right angles to the swivel, substantially as and for the purposes described.

3. The combination of the movable platform A, armed standard B, swivel D, and lever E, when arranged to operate substantially as herein described.

OLIVER H. FLOOK.

Witnesses:
EZRA MINNICK,
CHARLES W. KELLER.